United States Patent
Araki et al.

(10) Patent No.: US 10,297,278 B2
(45) Date of Patent: May 21, 2019

(54) MATERIAL FOR USE IN A TMR READ GAP WITHOUT ADVERSELY AFFECTING THE TMR EFFECT

(71) Applicant: HGST Netherlands B.V., Amsterdam (NL)

(72) Inventors: Satoru Araki, San Jose, CA (US); Diane L. Brown, San Jose, CA (US); Hiroaki Chihaya, Odawara (JP); Dustin W. Erickson, Morgan Hill, CA (US); David J. Seagle, Morgan Hill, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 180 days.

(21) Appl. No.: 14/449,119

(22) Filed: Jul. 31, 2014

(65) Prior Publication Data
US 2014/0342085 A1 Nov. 20, 2014

Related U.S. Application Data

(62) Division of application No. 12/916,256, filed on Oct. 29, 2010, now Pat. No. 8,804,287.
(Continued)

(51) Int. Cl.
*G11B 5/265* (2006.01)
*G11B 5/255* (2006.01)
(Continued)

(52) U.S. Cl.
CPC .............. *G11B 5/255* (2013.01); *B82Y 10/00* (2013.01); *B82Y 25/00* (2013.01); *C25D 5/12* (2013.01);
(Continued)

(58) Field of Classification Search
CPC ........... G11B 5/255; G11B 5/23; G11B 5/232; G11B 2220/00; G11B 5/265; G11B 5/2651; G11B 5/39
(Continued)

(56) References Cited

U.S. PATENT DOCUMENTS

| 4,414,596 A | 11/1983 | Nakamichi |
| 5,855,056 A | 1/1999 | Cates |

(Continued)

FOREIGN PATENT DOCUMENTS

| JP | 6-243428 | 9/1994 |
| JP | 2009032337 A | 2/2009 |

*Primary Examiner* — Tabassom Tadayyon Eslami
(74) *Attorney, Agent, or Firm* — Patterson + Sheridan, LLP; Steven Versteeg

(57) ABSTRACT

Structures and methods for fabrication servo and data heads of tape modules are provided. The servo head may have two shield layers spaced apart by a plurality of gap layers and a sensor. Similarly, the data head may have two shield layers spaced apart by a plurality of gap layers and a sensor. The distance between the shield layers of the servo head may be greater than the distance between the shield layers of the data head. The material of the gap layers may include tantalum or an alloy of nickel and chromium. The material for the gap layers permits deposition of gap layers with sufficiently small surface roughness to prevent distortion of the tape module and increase the stability of the tape module operation.

20 Claims, 10 Drawing Sheets

Related U.S. Application Data

(60) Provisional application No. 61/326,607, filed on Apr. 21, 2010.

(51) Int. Cl.
*B82Y 10/00* (2011.01)
*B82Y 25/00* (2011.01)
*C25D 5/12* (2006.01)
*G11B 5/008* (2006.01)
*G11B 5/39* (2006.01)
*G11B 5/23* (2006.01)

(52) U.S. Cl.
CPC ............ *G11B 5/00821* (2013.01); *G11B 5/23* (2013.01); *G11B 5/398* (2013.01); *G11B 5/3909* (2013.01); *G11B 5/3912* (2013.01); *G11B 5/3958* (2013.01); *G11B 5/3977* (2013.01)

(58) Field of Classification Search
USPC ..... 360/319, 251, 261, 324.2, 271; 427/127, 427/128, 129, 130, 131, 132; 134/134
See application file for complete search history.

(56) References Cited

U.S. PATENT DOCUMENTS

| | | |
|---|---|---|
| 6,271,998 B1 | 8/2001 | Coehoorn et al. |
| 6,344,951 B1 | 2/2002 | Sato et al. |
| 6,452,757 B1 | 9/2002 | Yang |
| 6,704,178 B2 | 3/2004 | Nakashio et al. |
| 6,886,239 B2 | 5/2005 | Kasahara et al. |
| 7,327,539 B2 | 2/2008 | Saito |
| 7,591,064 B2 | 9/2009 | McFadyen |
| 2002/0131217 A1* | 9/2002 | Nakashio ............... B82Y 10/00 360/324.2 |
| 2004/0090705 A1 | 5/2004 | Kikuiri |
| 2006/0002023 A1* | 1/2006 | Le ......................... B82Y 10/00 360/125.62 |
| 2007/0091505 A1* | 4/2007 | Koeppe ................. G11B 5/0083 360/123.12 |
| 2007/0206333 A1 | 9/2007 | Watanabe et al. |
| 2009/0128965 A1 | 5/2009 | Mizuno et al. |
| 2011/0261487 A1 | 10/2011 | Araki et al. |

* cited by examiner

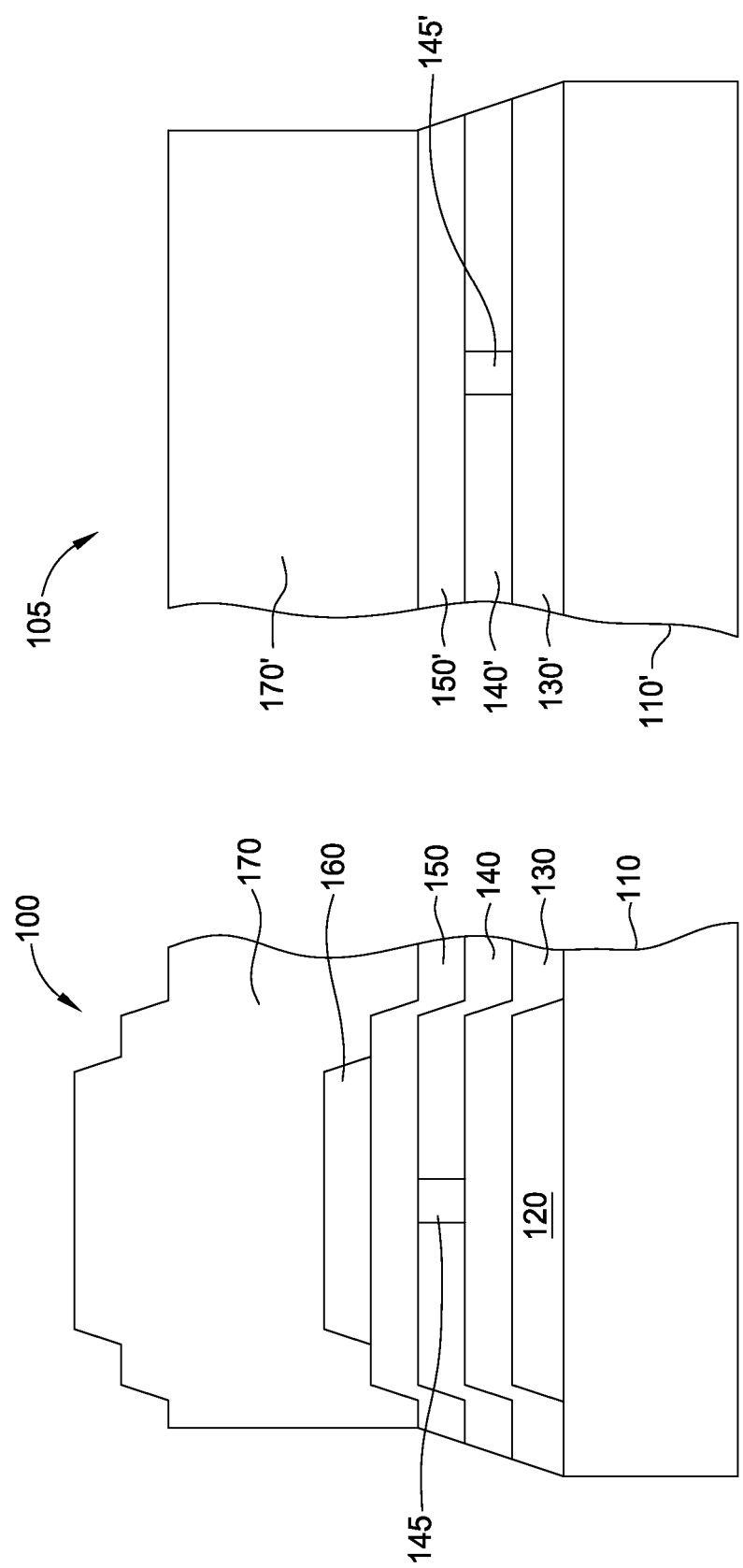

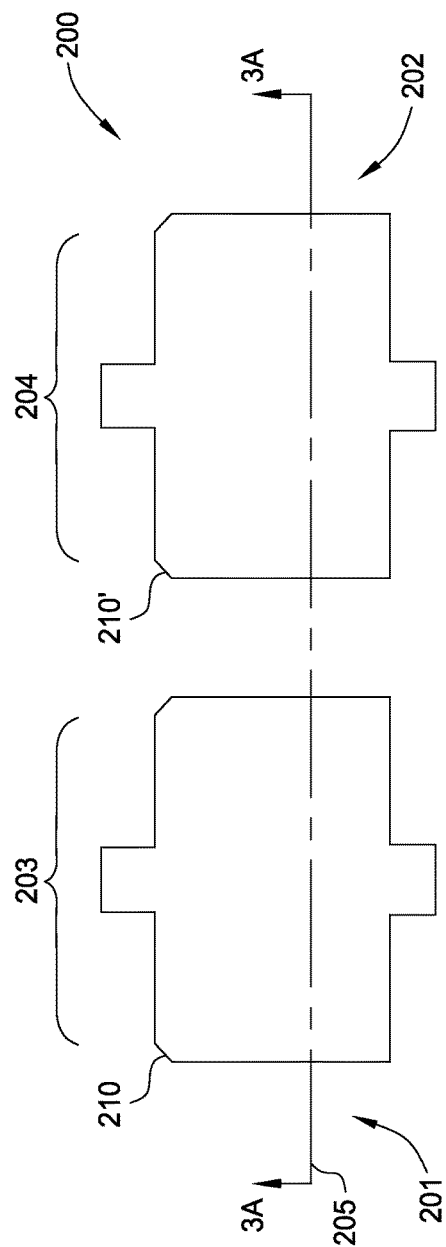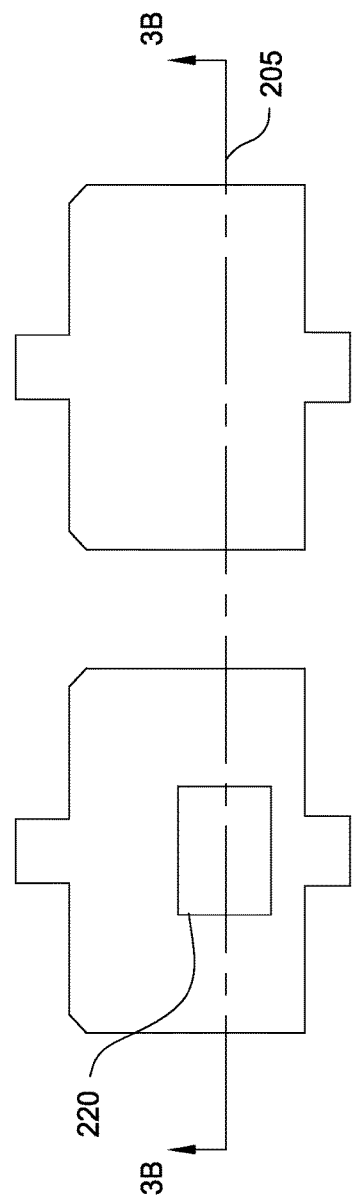

MATERIAL FOR USE IN A TMR READ GAP WITHOUT ADVERSELY AFFECTING THE TMR EFFECT

CROSS-REFERENCE TO RELATED APPLICATIONS

This application is a divisional application of U.S. patent application Ser. No. 12/916,256, filed Oct. 29, 2010, which application claims benefit of U.S. Provisional Patent Application Ser. No. 61/326,607, filed Apr. 21, 2010, which is herein incorporated by reference.

BACKGROUND OF THE INVENTION

Field of the Invention

Embodiments of the present invention generally relate to tape modules used for magnetic recording on tapes, and more specifically to fabrication of servo and data head structures of a tape module.

Description of the Related Art

Tape modules are used to record and readback information on tapes by magnetic processes. The tape modules use servo heads to read servo tracks to align the heads for reading data stored on data tracks. The servo heads and data heads are typically formed using a sensor disposed between two shield layers and directly contacting the two shield layers. However, current servo and data head designs do not provide adequate readback in newer tape designs that require higher data densities as well as different servo track and data track densities. Additionally, the industry is moving to a tunneling magnetoresistive (TMR) sensor, which has a read gap defined by the TMR film. With current tape densities, a wider read gap is needed in both the data and servo heads, and additionally, the respective gaps must be unique to one another.

It is desirable to provide new head structures and processes for forming the same that allow for achieving higher recording area density than is currently available for tape modules.

SUMMARY OF THE INVENTION

Structures and methods for fabrication of servo and data heads of tape modules are provided. The servo head may have two shield layers spaced apart by a plurality of gap layers and a sensor. Similarly, the data head may have two shield layers spaced apart by a plurality of gap layers and a sensor. The distance between the shield layers of the servo head may be greater than the distance between the shield layers of the data head. The material of the gap layers may include tantalum or an alloy of nickel and chromium. The material for the gap layers permits deposition of gap layers with sufficiently small surface roughness to prevent distortion of the TMR barrier and increase the stability of the tape module operation.

Embodiments of the present invention generally relate to tape modules, and more specifically to fabrication of servo and data head structures of a tape module. In one embodiment, a tape module is disclosed. The tape module includes a servo head structure. The servo head structure includes a first servo head shield layer, a first electrically conductive servo head gap layer disposed on the first servo head shield layer, and a second electrically conductive servo head gap layer disposed on the first electrically conductive servo head gap layer. The servo head structure also includes a servo head dielectric layer disposed on the second electrically conductive servo head gap layer and a servo head sensor disposed on the second electrically conductive servo head gap layer. The servo head also includes a third electrically conductive servo head gap layer disposed on the servo head dielectric layer and servo head sensor, a fourth electrically conductive servo head gap layer disposed on the third electrically conductive servo head gap layer, and a second servo head shield layer disposed on the fourth electrically conductive servo head gap layer.

In another embodiment, tape module is disclosed. The tape module includes a data head structure. The data head structure includes a first shield layer, a first gap layer disposed on the first shield layer, a dielectric layer disposed on the first gap layer, and a sensor disposed on the first gap layer. The data head structure also includes a second gap layer disposed on the dielectric layer and sensor, and a second shield layer disposed on the second gap layer.

In another embodiment, a method for forming a tape module is disclosed. The method includes forming a servo head structure on a substrate. The servo head structure is formed by a method that includes depositing a first servo head shield layer on the substrate, depositing a first electrically conductive servo head gap layer on the first servo head shield layer, depositing a second electrically conductive servo head gap layer on the first electrically conductive servo head gap layer, and forming a servo head sensor on the second electrically conductive servo head gap layer. The method also includes depositing a servo head dielectric layer on the second electrically conductive servo head gap layer, depositing a third electrically conductive servo head gap layer on the servo head dielectric layer and servo head sensor, depositing a fourth electrically conductive servo head gap layer on the third electrically conductive servo head gap layer, and depositing a second servo head shield layer on the fourth electrically conductive servo head gap layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a cross sectional view of a servo head and a data head according to one embodiment of the present invention;

FIGS. 2A-2H illustrate a series of top plan cross sectional views of the steps to form the servo head and the data head according to the embodiment of FIG. 1A;

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1B:
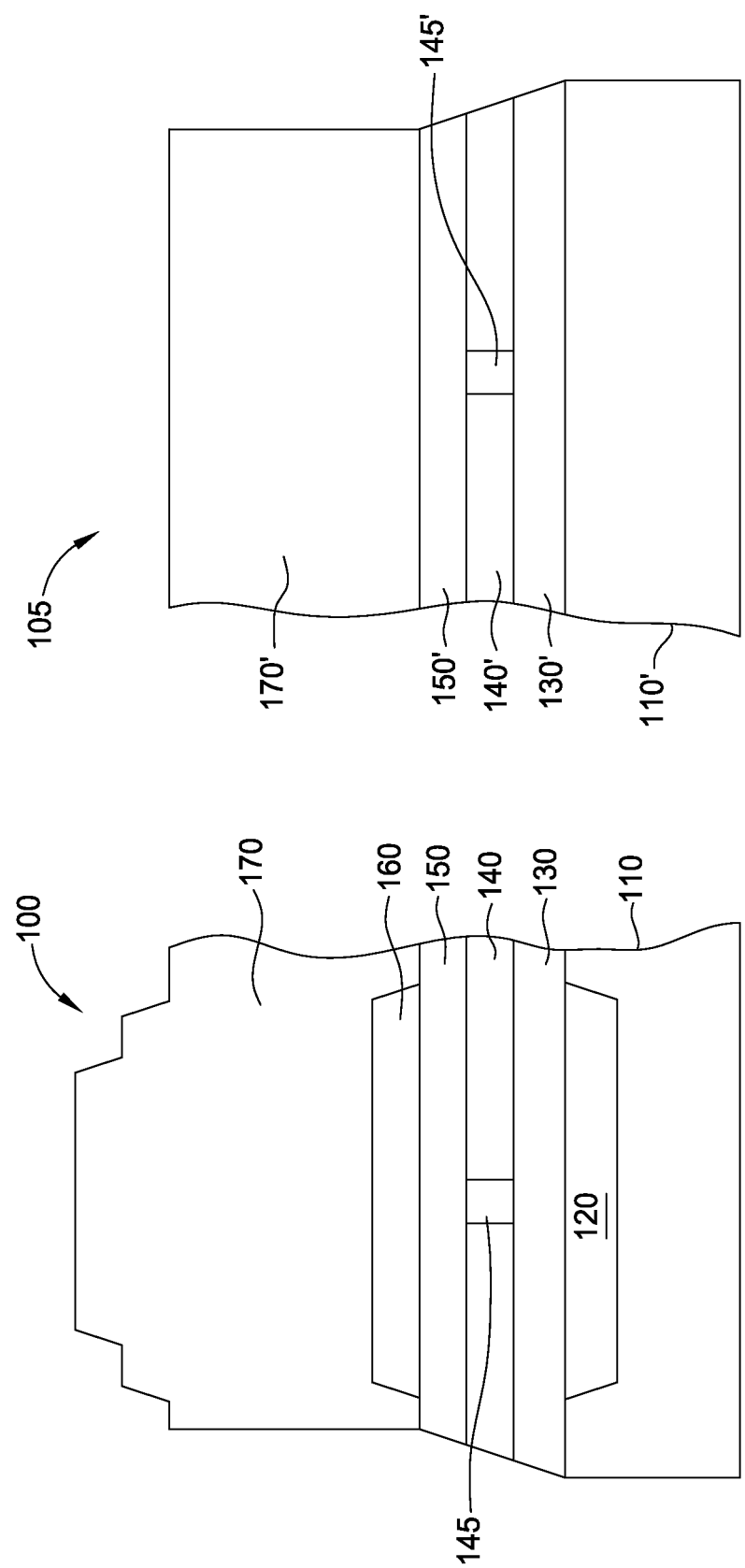
FIG. 1B is a cross sectional view of a servo head and a data head according to another embodiment of the present invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to tape modules, and more specifically to fabrication of servo and data head structures of a tape module. Referring now to FIG. 1A, a servo head 100 and a data head 105 are formed on a substrate surface in a spaced apart relationship according to one embodiment of the invention. It is to be understood that while only one servo head 100 and one data head 105 are shown, tape modules may have multiple servo heads 100 and multiple data heads 105. For example, an array of up to thirty-two data heads 105 may be present and bounded by two servo heads 100. Other combinations of data heads 105 and servo heads 100 are contemplated as well.

As shown in FIG. 1A, the servo head 100 includes a first shield layer 110, a first gap layer 120 formed on the first shield layer 110, a second gap layer 130 disposed on the first gap layer and any exposed portion of the first shield layer 110, a dielectric layer 140 formed on the second gap layer 130 with a sensor 145 formed through the dielectric layer, a third gap layer 150 disposed on the dielectric layer 140 and sensor 145, a fourth gap layer 160 disposed on the third gap layer 150, and a second shield layer 170 disposed on the fourth gap layer 160 and any exposed portions of the third gap layer 150.

The data head 105 is formed concurrently with the servo head 100 and includes several layers in common, which are marked with the related material layer deposition. For example, the first gap layer 130' of the data head corresponds to the second gap layer 130 of the servo head 100.

The data head 105 includes a first shield layer 110', a first gap layer 130' conformally formed on the first shield layer 110', a dielectric layer 140' formed on the first gap layer 130' with a sensor 145' formed through the dielectric layer, a second gap layer 150' conformally disposed on the dielectric layer 140' and sensor 145', and a second shield layer 170' disposed on the second gap layer 150'.

The first and second shield layers are each formed by an electrodeposition process, such as electroplating or electroless deposition. The first and second shield layers each comprise a magnetic material selected from the group consisting of nickel-iron alloy, cobalt-iron alloy, cobalt-nickel-iron alloy, and combinations thereof. A nickel-iron alloy of 80 atomic percent nickel and 20 atomic percent iron may be used as the first and second shield layer material. The first shield layer may be formed on or in a substrate surface material of alumina ($Al_2O_3$) or any other suitable material.

The first gap layer, the second gap layer, the third gap layer, and the fourth gap layer each comprise a non-magnetic material selected from the group consisting of an alloy of nickel and chromium, tantalum, and combinations thereof. The first gap layer, the second gap layer, the third gap layer, and the fourth gap layer may be deposited by a physical vapor deposition process (PVD or sputtering) and two or more of the deposition processes may be performed in the same chamber or same processing tool. After each layer is deposited, the layer may be patterned utilizing milling or photolithographic processing.

The first gap layer, the second gap layer, the third gap layer, and the fourth gap layer may be deposited each at a thickness from about 40 nm to about 90 nm (nanometers), however, any thickness may be used based on the desired gap distances and sizes of the respective heads for the tape modules. For example, the first gap layer may comprise 80 nm of NiCr alloy, the second gap layer of 45 nm of NiCr alloy, the third gap layer of 45 nm NiCr alloy, and the fourth gap layer may be deposited 80 nm of NiCr alloy.

The dielectric layer may also be deposited by a physical vapor deposition process (PVD or sputtering) and may be performed in the same chamber or same processing tool with the one or more gap deposition processes. The dielectric layer may comprise a suitable dielectric material, such as a dielectric material selected from the group of aluminum oxide, silicon oxide, silicon nitride, and combinations thereof.

The first and second shield layers 110, 110', 170, 170' may be spaced apart by the gap layers. The servo head 100 has a greater spacing between shield layers 110, 170 than the data head 105 in the embodiment of FIG. 1A. In the embodiment of FIG. 1B, the spacing for the servo head 100 and data head 105 may be substantially identical.

Referring now to FIG. 1B, a servo head 100 and a data head 105 are formed on a substrate surface in a spaced apart relationship according to one embodiment of the invention. As shown in FIG. 1B, the servo head 100 includes a first shield layer 110, a first gap layer 120 formed in the first shield layer 110, a second gap layer 130 disposed on the first gap layer 120 and any exposed portion of the first shield layer 110, a dielectric layer 140 formed on the second gap layer 130 with a sensor 145 formed through the dielectric layer, a third gap layer 150 disposed on the dielectric layer 140 and sensor 145, a fourth gap layer 160 disposed on the third gap layer 150, and a second shield layer 170 disposed on the fourth gap layer 160 and any exposed portion of the third gap layer 150.

The data head 105 is formed concurrently with the servo head 100 and includes several layers in common, which are marked with the related material layer deposition. For example, the first gap layer 130' of the data head corresponds to the second gap layer 130 of the servo head 100.

The data head 105 includes a first shield layer 110', a first gap layer 130' conformally formed on the first shield layer 110', a dielectric layer 140' formed on the first gap layer 130' with a sensor 145' formed through the dielectric layer, a second gap layer 150' conformally disposed on the dielectric layer 140' and sensor 145', and a second shield layer 170' disposed on the second gap layer 150'.

The first and second shield layers are each formed by an electrodeposition process, such as electroplating or electroless deposition. The first and second shield layers each comprise a magnetic material selected from the group consisting of nickel-iron alloy, cobalt-iron alloy, cobalt-nickel-iron alloy, and combinations thereof. A nickel-iron alloy of 80 atomic percent nickel and 20 atomic percent Iron may be used as the first and second shield layer material.

The first gap layer, the second gap layer, the third gap layer, and the fourth gap layer each comprise a non-magnetic material selected from the group consisting of an alloy of nickel and chromium, tantalum, and combinations thereof. The first gap layer, the second gap layer, the third gap layer, and the fourth gap layer may be deposited by a physical vapor deposition process (PVD or sputtering) and may be performed in the same chamber or same processing tool. After each layer is deposited, the layer may be patterned utilizing milling or photolithographic processing.

The first gap layer, the second gap layer, the third gap layer, and the fourth gap layer may be deposited each at a thickness from about 40 nm to about 90 nm (nanometers), however, any thickness may be used based on the desired gap distances and sizes of the respective heads for the tape modules. For example, the first gap layer may comprise 80 nm of NiCr alloy, the second gap layer of 45 nm of NiCr alloy, the third gap layer of 45 nm NiCr alloy, and the fourth gap layer may be deposited 80 nm of NiCr alloy.

The dielectric layer may also be deposited by a physical vapor deposition process (PVD or sputtering) and may be performed in the same chamber or same processing tool with the one or more gap deposition processes. The dielectric layer may comprise a suitable dielectric material, such as a dielectric material selected from the group of aluminum oxide, silicon oxide, silicon nitride, and combinations thereof.

FIGS. 2A-2H illustrate a series of top plan views of the steps to form the servo head and the data head according to the embodiment of FIG. 1A. FIGS. 3A-3F illustrate a series of cross sectional views of the steps to form the servo head and the data head according to the embodiment of FIG. 1A. The method described herein may be used for creating two different shield to shield gaps on the same substrate for the servo head and the data head.

FIG. 2A illustrates a top plan view of the shaped first shield layers 210 and 210' of a servo head structure 201 of the servo head portion 203 of a substrate 200 and a data head structure 202 of the data head portion 204 of the substrate 200 respectively being formed on the substrate 200. Line 205 represents where the formed substrate will be removed to form an air bearing surface (ABS). FIG. 3A is a schematic cross-section view of the servo head structure 201 and a data head structure 202 along line 205. The first shield layers 210, 210' may each be deposited by an electrodeposition process, such as electroplating or electroless deposition. The first shield layers 210, 210' may each comprise a magnetic material selected from the group consisting of nickel-iron alloy, cobalt-iron alloy, cobalt-nickel-iron alloy, and combinations thereof. A nickel-iron alloy of 80 atomic percent nickel and 20 atomic percent iron may be used as the first shield layer 210, 210' material. Once deposited, the first shield layers 210, 210' may be full film overcoated with a dielectric such as alumina and then chemical mechanical polished (CMP) for planarization and minimization of the surface roughness.

Figure 2C:
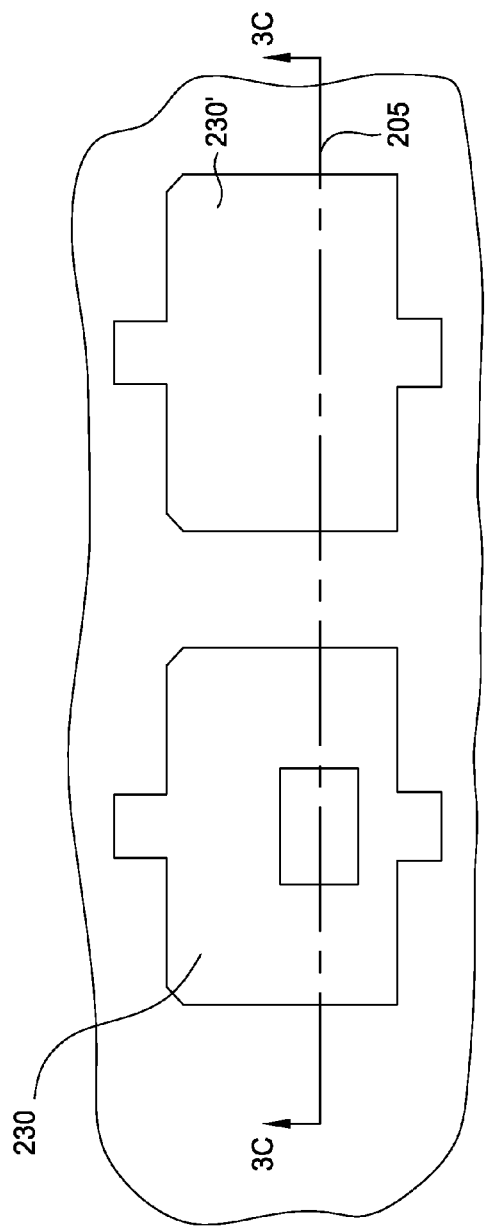
Figure 3A:
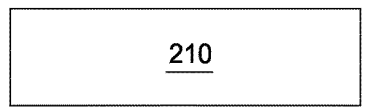
FIGS. 3A-3F illustrate a series of cross sectional views of the steps to form the servo head and the data head according to the embodiment of FIG. 1A.
Figure 3A:
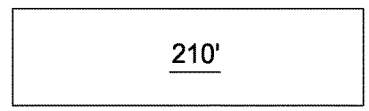
Figure 3B:
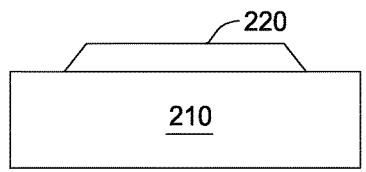

The first gap layer 220 is then formed on the servo head portion shield layer 210 as shown in FIG. 2B and FIG. 3B. The first gap layer 220 may comprise a non-magnetic material selected from the group consisting of an alloy of nickel and chromium, tantalum, and combinations thereof. The first gap layer 220 may be deposited by a physical vapor deposition process (PVD or sputtering). The first gap layer 220 is not present on the data head portion shield layer 210'.

In one embodiment, the first gap layer 220 may be formed by blanket depositing first gap layer 220 material over the both first shield layers 210, 210' and then patterning the deposited material. The patterning may comprise forming a mask over the deposited layer and the milling or etching the portions of the material not covered by the mask. The mask is then removed to leave the first gas layer 220 on the first shield layer 210 of the servo head structure 201.

In another embodiment, the first gap layer 220 may be formed by first depositing a photoresist layer and developing the photoresist layer to form a mask. Thereafter, the first gap layer 220 is deposited on the exposed portions of the first shield layer 210. The mask is then removed leaving the first gap layer 220 formed over the servo head structure 201. During the formation of the first gap layer 220, the sidewalls may be tapered. The first gap layer 220 may be formed to be about 25 μm by about 30 μm (height by width) in a shield layer of about 38 μm by 60 μm.

Figure 3C:
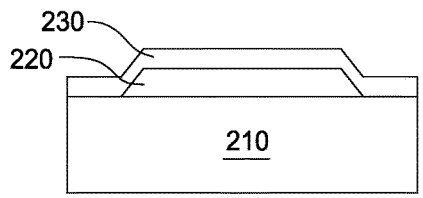
Figure 3C:
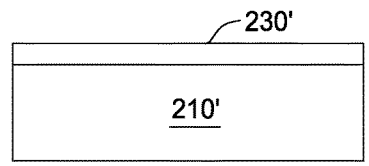

The second gap layer 230 of the servo head portion 203 and the corresponding first gap layer 230' of the data head portion 204 are deposited on the first gap layer 220 and the exposed portion of the shaped first shield layers 210 and 210' as shown in FIG. 2C and FIG. 3C. The second gap layer 230 and first gap layer 230' may each comprise a non-magnetic material selected from the group consisting of an alloy of nickel and chromium, tantalum, and combinations thereof. The material for the second gap layer 230 and first gap layer 230' is selected to minimize the surface roughness of the deposited layer so that the sensor 245, 245' may be deposited thereover. If no gap layers were used and the sensors were simply deposited on the shield layers, the shield layers would be polished to obtain a desired surface roughness. However, because the gap layers are significantly thinner than the shield layers, polishing of the gap layers may not be desirable. Therefore, the choice of material for the gap layers will affect the surface roughness. It has surprisingly been found that non-magnetic material selected from the group consisting of an alloy of nickel and chromium, tantalum, and combinations thereof for any of the gap layers will be sufficient to obtain the desired surface roughness when deposited by a physical vapor deposition process. It has been observed that if the film roughness of the gap layers is sufficiently great, strong coupling between the free and pin layers of the sensor 245, 245' occurs that causes distortion and instability in the readback signal. The surface roughness that is obtained utilizing the specific materials (e.g., nickel-chromium alloy or tantalum) discussed herein has been found to be sufficiently small to prevent distortion and improve stability.

The second gap layer 230 and first gap layer 230' may be deposited by a physical vapor deposition process (PVD or sputtering). The first gap layer 220 and the second gap layer 230 on the servo head portion 203 form a first spacer between the first shield layer 210 and the sensor 245. The second gap layer 230 and first gap layer 230' may be formed by blanket depositing the material over the substrate 200, first gap layer 220, exposed portions of the first shield layer 210, and the first shield layer 210'. Once deposited, the material is then removed from selected portions to leave the material around the data and servo head area.

Figure 2D:
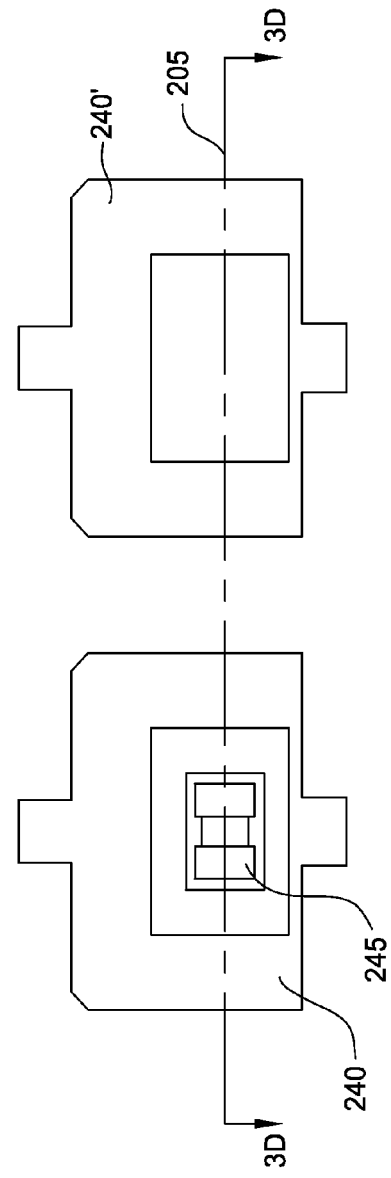
Figure 3D:
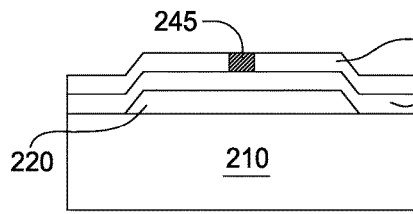
Figure 3D:
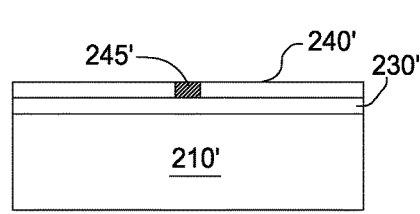

The dielectric layer 240 and sensor 245 of the servo head portion 203 and the corresponding dielectric layer 240' and sensor 245' (not shown in FIG. 2D) of the data head portion 204, are then formed on the second gap layers 230 and 230' respectively as shown in FIG. 2D and FIG. 3D. The sensors 245 and 245' may be of any type of suitable sensor used for the manufacturing of TMR devices. In one embodiment, the sensors 245, 245' are formed by depositing multiple material layers and then etching back the layers, either individually or collectively, to form the final sensors 245, 245'. The dielectric layers 240, 240' are then formed by blanket depositing the dielectric material, forming a photoresist mask thereover, and removing the exposed dielectric material. The exposed dielectric material that is removed is formed over the sensors 245, 245'. Thus, after removal of the exposed dielectric material, the dielectric material will remain everywhere except over the sensors 245, 245'. The photoresist mask is then removed. Alternatively, the dielectric layers 240, 240' may be formed by first forming a photoresist mask over the sensors 245, 245' and then depositing the dielectric layers 240, 240' on the gap layers not covered by the mask. The photoresist mask is then removed. In an alternative embodiment, the dielectric layers 240, 240' may be formed prior to forming the sensors 245, 245'.

Figure 2E:
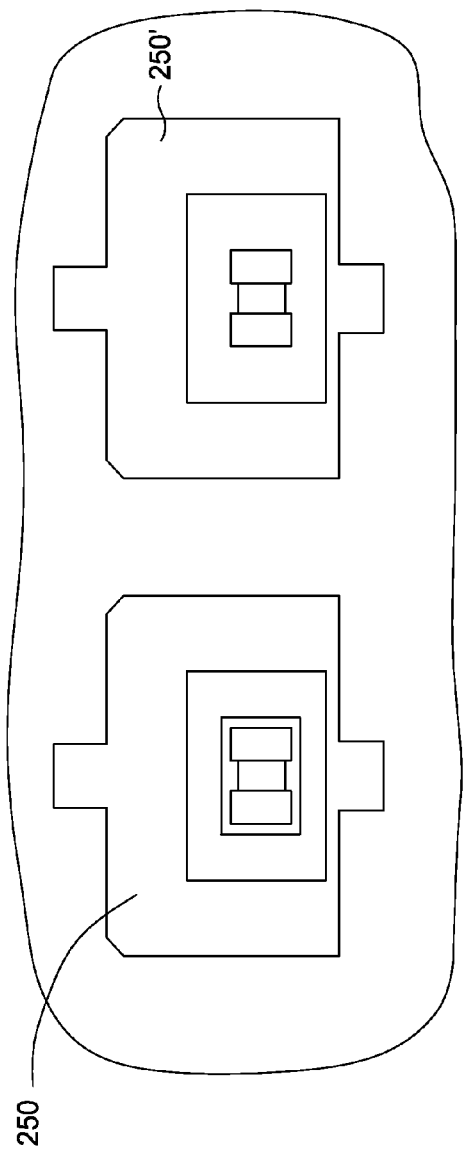
Figure 3E:
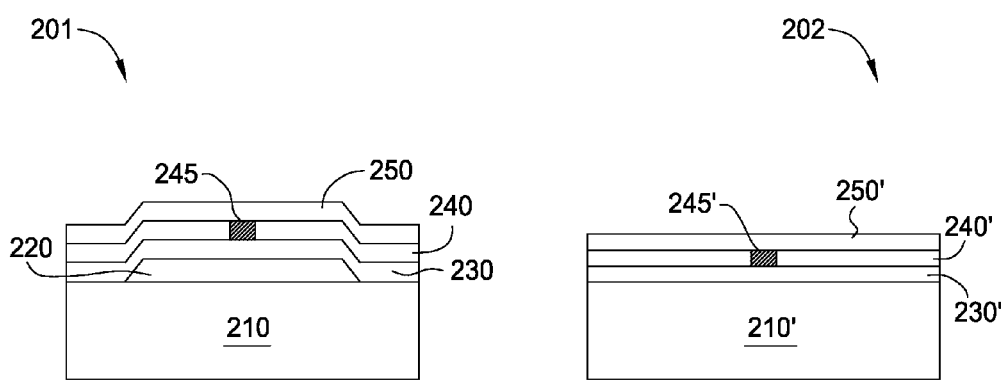

The third gap layer 250 of the servo head portion 203 and the corresponding second gap layer 250' of the data head portion 204, are deposited on the dielectric layer 240 and sensor 245 of the servo head portion 203 and corresponding dielectric layer 240' and sensor 245' (not shown in FIG. 2D) of the data head portion 204, as shown in FIG. 2E and FIG. 3E. The third gap layer 250 and second gap layer 250' may each comprise a non-magnetic material selected from the group consisting of an alloy of nickel and chromium, tantalum, and combinations thereof. The material for the third gap layer 250 and second gap layer 250' is selected to minimize the surface roughness of the deposited third gap layer 250 and second gap layer 250' at the interface with the sensors 245, 245'. The third gap layer 250 and second gap layer 250' may be deposited by a physical vapor deposition process (PVD or sputtering). The third gap layer 250 and second gap layer 250' may be deposited and then etched or milled back to the desired final shape.

Figure 2F:
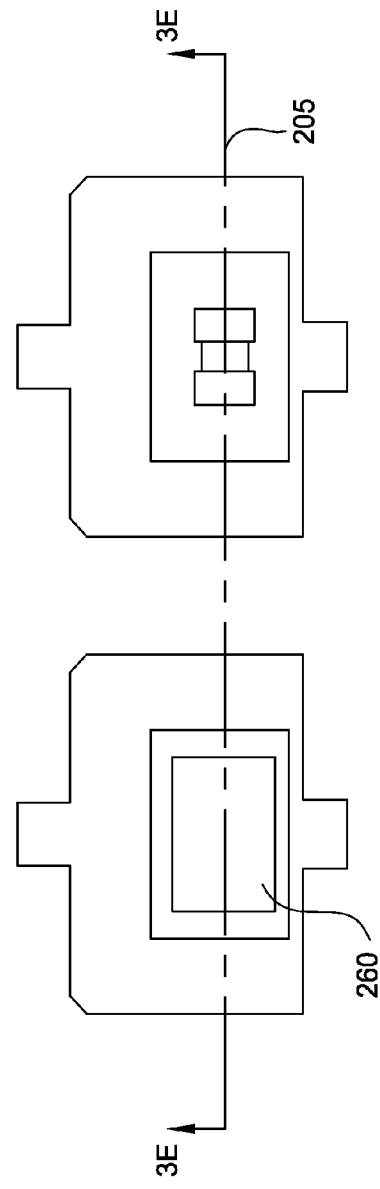
Figure 3F:
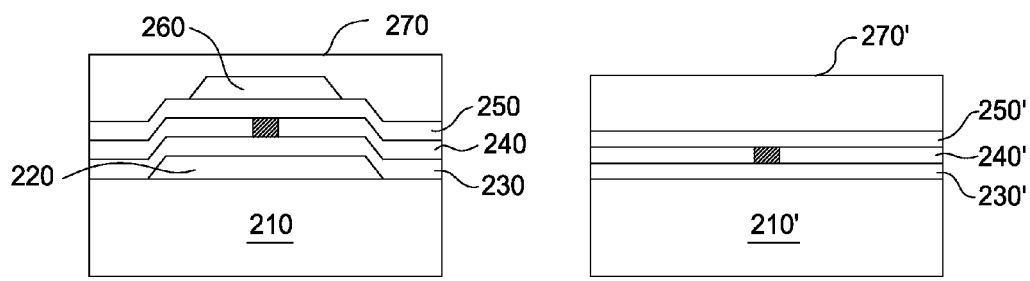

After the third gap layer 250 and second gap layer 250' are formed, the fourth gap layer 260 is deposited and patterned on the third gap layer 250 of the servo head portion as shown in FIG. 2F and FIG. 3F. The fourth gap layer 260 may comprise a non-magnetic material selected from the group consisting of an alloy of nickel and chromium, tantalum, and combinations thereof. The material for the fourth gap layer 260 may comprise the same material as the third gap layer 250. The fourth gap layer 260 may be deposited by a physical vapor deposition process (PVD or sputtering). The fourth gap layer 260 deposition process includes the deposition of the fourth gap layer 260 material followed by an etching process, such as an ion milling process using a lithographic patterning process, to remove some of the fourth gap layer 260 material forming tapered sides and exposing portions of the underlying of the underlying third gap layer 250 material. The third gap layer 250 and the fourth gap layer 260 form a second spacer between the second shield 270 and the sensor 245.

Figure 2G:
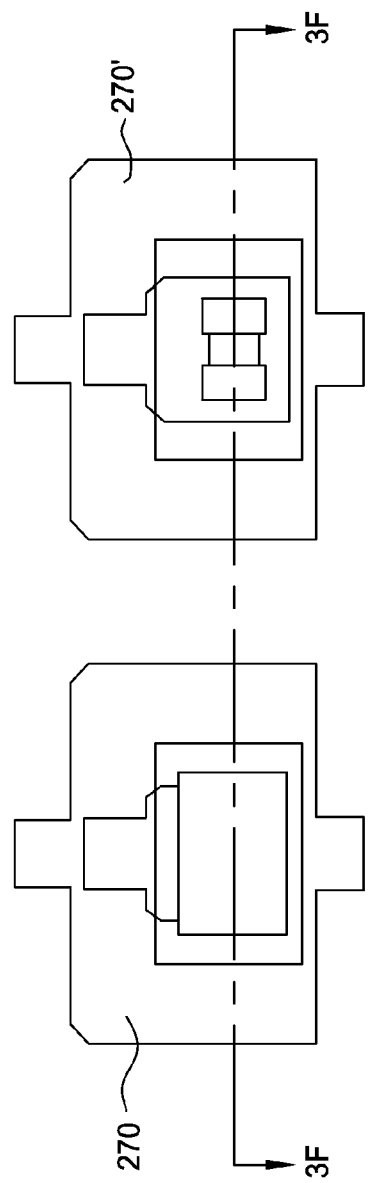

The second shield layer 270 of the servo head portion 203 and the corresponding second shield layer 270' of the data head portion 204, is deposited on the third gap layer 250 and fourth gap layer 260 of the servo head portion 203, and the second gap portion 250' of the data head portion 204, as shown in FIG. 2G and FIG. 3F to form the structures as shown in FIG. 1A. The second shield layers 270, 270' may have a different area than the first shield layers 210, 210'. In general, the second shield layers 270, 270' may each be sufficient in size to cover the sensors 245, 245' entirely. Each of the shield layers 210, 210', 270, 270' may be deposited to a thickness between 0.5 μm and 2.0 μm, such as 1 μm. In order to deposit the second shield layers 270, 270' by electrochemical plating or electroless plating, a seed layer is first deposited by sputtering. The seed layer is blanket deposited. Then, the second shield layers 270, 270' are deposited through a photoresist mask. The photoresist mask is then removed. The seed layer that was covered by the mask may then be removed by an etching process.

Figure 2H:
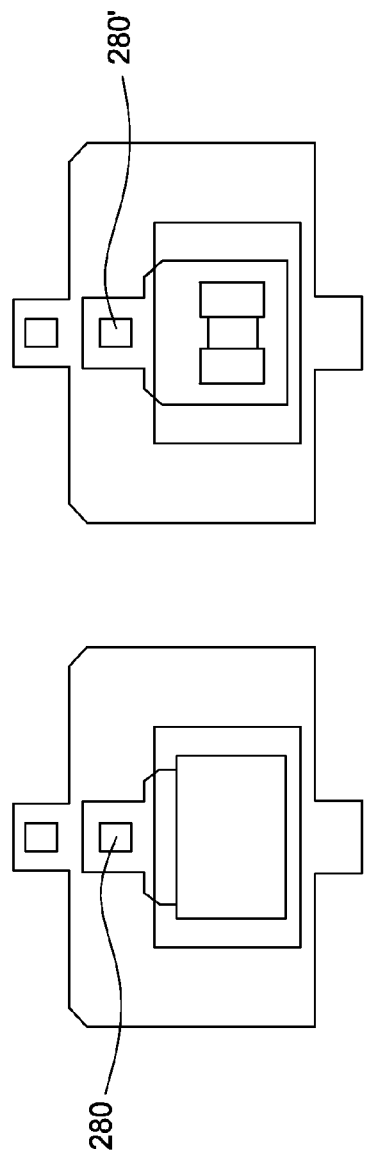

A protective layer may be deposited over the two portions for completion of the device prior to forming the air bearing surface as shown in FIG. 2H. In one embodiment, the protective layer may comprise alumina. Vias 208 may be etched through the alumina layer to permit electrical connection of the servo head portion 203 and data head portion 204 to bonding pads using high conductivity leads.

Figure 4A:
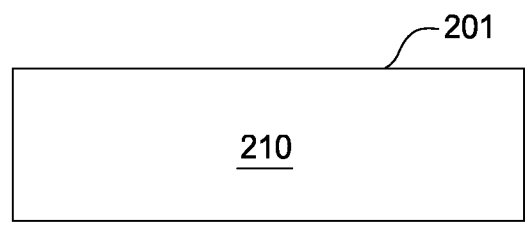
FIGS. 4A-4F illustrate a series of cross sectional views of the steps to form the servo head according to the embodiment of FIG. 1B.
Figure 4B:
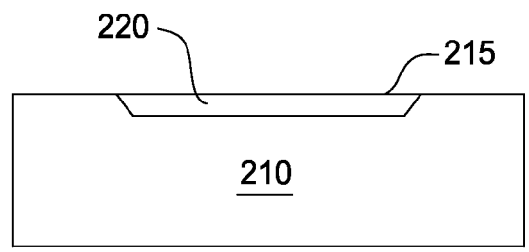

FIG. 4A is a schematic cross-section view of a servo head structure 201 along line 205 according to the servo head structure of FIG. 1B. The shaped shield layer 210 is formed on the substrate 200 as shown in FIG. 4A. A feature definition 215 is formed in the shaped shield layer 210 surface. The feature definition 215 may be formed by any conventional process, such as ion milling, and is preferably formed with tapered (from the bottom to top of the feature definition) or vertical sides. The feature definition 215 is milled to a targeted depth.

The first gap layer 220 material is deposited in the feature definition 215 with a thickness equal to the targeted depth of the feature definition 215. The formation of the feature definition 215 and the deposition of the first gap layer 220 may occur utilizing the same photolithographic mask. For example, after the shield layer 210 is deposited on a substrate 200, a photolithographic mask is formed by depositing a photoresist and then developing the photoresist to form the mask. The shield layer 210 is then selectively milled or etched using the mask so that the feature definition 215 is formed. Then, utilizing the same mask, the first gap layer 220 is deposited into the feature definition 215. The mask and any of the first gap layer that is deposited thereon is then removed.

Figure 4C:
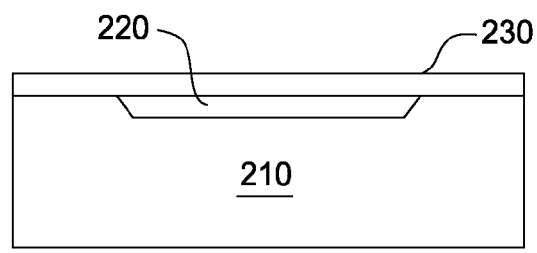
Figure 4D:
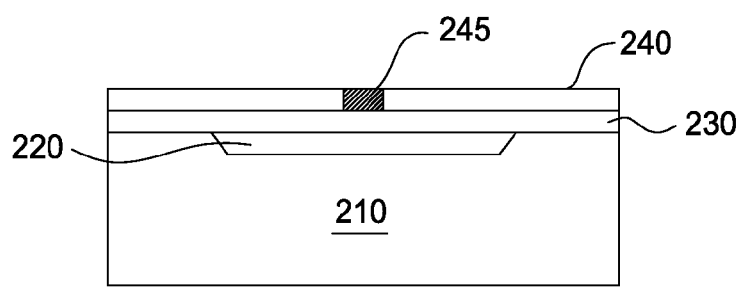
Figure 4E:
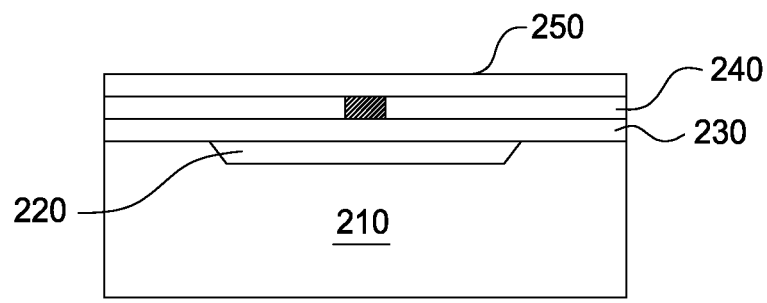

The second gap layer 230 is conformally deposited on the planar surface of the first shield layer 210 and the first gap layer 220 as shown in FIG. 4C. The dielectric layer 240 and sensor 245 are deposited, patterned, and formed on the second gap layer 230 as shown in FIG. 4D. The third gap layer 250 is conformally deposited on the dielectric layer 240 and sensor 245 as shown in FIG. 4E.

Figure 4F:
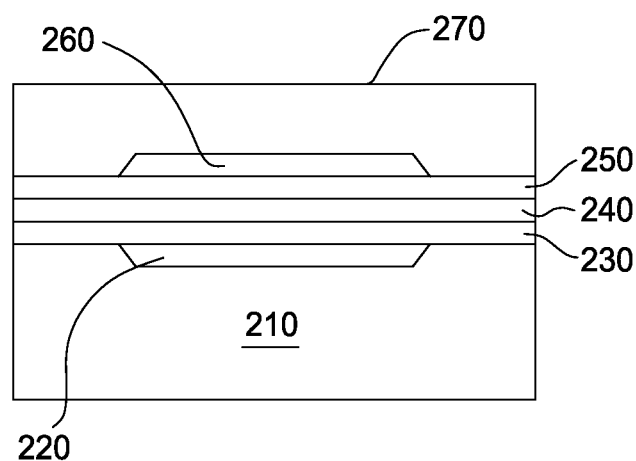

The fourth gap layer 260 is deposited and patterned on the third gap layer 250 as shown in FIG. 4F. The fourth gap layer 260 deposition process includes the deposition of the fourth gap layer 260 material followed by an etching process, such as an ion milling process using a lithographic patterning process, to remove some of the fourth gap layer 260 material forming tapered ends and exposing portions of the underlying of the underlying third gap layer 250 material.

The second shield layer 270 is deposited on the third gap layer 250 and fourth gap layer 260, as shown in FIG. 4F to form the servo head structure as shown in FIG. 1B. The data head structure of FIG. 1B is formed as described above for the data head structure of FIG. 1A.

By utilizing electrically conductive gap layers between shield layers in both the servo head and data head of a tape module, the tape module may be effective and be capable of utilizing a TMR sensor. The gap layers may comprise tantalum, an alloy of nickel and chromium, or combinations thereof. The material of the gap layers is beneficial because the gap layers will have an acceptable surface roughness without polishing, and polishing the gap layers may not be possible due to relatively small thickness of the gap layers.

While the foregoing is directed to other embodiments of the present invention, other and further embodiments of the invention may be devised without departing from the basic scope thereof, and the scope thereof is determined by the claims that follow.

What is claimed is:

1. A method for forming a tape module, comprising:
   forming a servo head structure on a substrate, comprising:
   depositing a first servo head shield layer on the substrate, the first servo head shield layer having a feature definition formed therein, wherein the feature definition has a milled targeted depth;
   depositing a first electrically conductive servo head gap layer on the first servo head shield layer, wherein the first electrically conductive servo head gap layer is formed within the first servo head shield layer feature definition and has a thickness equal to the feature definition milled targeted depth;
   depositing a second electrically conductive servo head gap layer on the first electrically conductive servo head gap layer;
   forming a servo head sensor on the second electrically conductive servo head gap layer;
   depositing a servo head dielectric layer on the second electrically conductive servo head gap layer, wherein the servo head sensor is formed through the servo head dielectric layer and wherein the sensor has a bottom face only in contact with the second electrically conductive servo head gap layer, a top face only connected to a third electrically conductive servo head gap layer and a side only connected to the servo head dielectric layer;
   depositing the third electrically conductive servo head gap layer on the servo head dielectric layer and servo head sensor;
   depositing a fourth electrically conductive servo head gap layer on the third electrically conductive servo head gap layer; and
   depositing a second servo head shield layer on the fourth electrically conductive servo head gap layer.

2. The method of claim 1, further comprising etching the feature definition into the first servo head shield layer and depositing the first electrically conductive servo head gap layer in the feature definition.

3. The method of claim 1, further comprising:
   forming a data head structure on the substrate, comprising:
   depositing a first data head shield layer on the substrate;
   depositing a first data head gap layer on the first data head shield layer;
   forming a data head sensor on the first data head gap layer;
   depositing a data head dielectric layer on the first data head gap layer;
   depositing a second data head gap layer on the data head dielectric layer and data head sensor; and
   depositing a second data head shield layer on the second data head gap layer.

4. The method of claim 3, wherein the third electrically conductive servo head gap layer and the second data head gap layer are deposited during the same deposition process.

5. The method of claim 3, each of the first electrically conductive servo head gap layer, the second electrically conductive servo head gap layer, the third electrically conductive servo head gap layer, the fourth electrically conductive servo head gap layer, the first data head gap layer, and the second data head gap layer are deposited by a sputtering process.

6. The method of claim 5, wherein the first electrically conductive servo head gap layer, the second electrically conductive servo head gap layer, the third electrically conductive servo head gap layer, the fourth electrically conductive servo head gap layer, the first data head gap layer, and the second data head gap layer each comprise a nonmagnetic material selected from the group consisting of an alloy of nickel and chromium, tantalum, and combinations thereof.

7. The method of claim 6, wherein the second electrically conductive servo head gap layer and the first data head gap layer are deposited during the same deposition process.

8. The method of claim 7, wherein the first data head shield layer, the second data head shield layer, the first servo head shield layer, and the second servo head shield layer each comprise a magnetic material selected from the group consisting of nickel-iron alloy, cobalt-iron alloy, cobalt-nickel-iron alloy, and combinations thereof.

9. The method of claim 8, wherein the first data head shield layer, the second data head shield layer, the first servo head shield layer, and the second servo head shield layer are each deposited by an electroplating process.

10. The method of claim 9, further comprising depositing a seed layer over the fourth electrically conductive servo head gap layer and the second data head gap layer prior to depositing the second servo head shield layer and the second data head shield layer.

11. A method for forming a tape module, comprising:
    forming a servo head structure on a substrate, comprising:
    depositing a first servo head shield layer on the substrate, the layer having a feature definition with a depth;
    depositing a first conductive servo head gap layer on the first servo head shield layer with a thickness equal to the feature definition depth, wherein the first conductive servo head gap layer is formed within the first servo head shield layer feature definition;
    depositing a second conductive servo head gap layer on the first conductive servo head gap layer;
    forming a servo head sensor on the second conductive servo head gap layer;
    depositing a servo head dielectric layer on the second conductive servo head gap layer, wherein the servo head sensor is formed through the servo head dielectric layer and wherein the servo head sensor has a bottom face only in contact with the second conductive servo head gap layer, a top face only connected to a third conductive servo head gap layer and a side only connected to the servo head dielectric layer;
    depositing the third conductive servo head gap layer on the servo head dielectric layer and the servo head sensor;
    depositing a fourth conductive servo head gap layer on the third conductive servo head gap layer; and
    depositing a second servo head shield layer on the fourth conductive servo head gap layer.

12. The method according to claim 11, wherein the first conductive servo head gap layer, the second conductive servo head gap layer, the third conductive servo head gap layer and the fourth conductive servo head gap layer comprise at least one of tantalum, an alloy of nickel and chromium.

13. The method according to claim 11, wherein the first and the second servo head shield layers are formed through an electrodeposition process.

14. The method according to claim 11, wherein the first and the second servo head shield layers are formed through electroless deposition.

15. A method for forming a tape module, comprising:
forming a servo head structure on an alumina substrate, comprising:
depositing a first servo head shield layer one of on and in the substrate, the first servo head shield layer having a feature definition formed therein, wherein the feature definition has a depth;
depositing a first electrically conductive servo head gap layer on the first servo head shield layer, wherein the first electrically conductive servo head gap layer is formed within the first servo head shield layer feature definition and has a thickness equal to the feature definition depth;
depositing a second electrically conductive servo head gap layer on the first electrically conductive servo head gap layer;
forming a servo head sensor on the second electrically conductive servo head gap layer;
depositing a servo head dielectric layer on the second electrically conductive servo head gap layer, wherein the servo head sensor is formed through the servo head dielectric layer and wherein the servo head sensor has a bottom face only in contact with the second electrically conductive servo head gap layer, a top face only connected to a third electrically conductive servo head gap layer and a side only connected to the servo head dielectric layer;
depositing the third electrically conductive servo head gap layer on the servo head dielectric layer and the servo head sensor;
depositing a fourth electrically conductive servo head gap layer on the third electrically conductive servo head gap layer; and
depositing a second servo head shield layer on the fourth electrically conductive servo head gap layer.

16. The method according to claim 15, wherein the first electrically conductive servo head gap layer, the second electrically conductive servo head gap layer, the third electrically conductive servo head gap layer and the fourth electrically conductive servo head gap layer comprise at least one of tantalum, an alloy of nickel and chromium.

17. The method according to claim 15, wherein at least one of the first and the second electrically conductive servo head gap layer are formed through physical vapor deposition.

18. The method according to claim 15, wherein at least one of the third and the fourth electrically conductive servo head gap layer are formed through physical vapor deposition.

19. The method according to claim 15, wherein the first and the second servo head shield layers are formed through an electrodeposition process.

20. The method according to claim 15, wherein the first and the second servo head shield layers are formed through electroless deposition.

* * * * *